(12) United States Patent
Tsai et al.

(10) Patent No.: US 6,332,275 B1
(45) Date of Patent: Dec. 25, 2001

(54) MARGIN INSPECTOR FOR IC WAFERS

(75) Inventors: Wen-Wang Tsai, Hsinchu; Chun-Yan Wu, YiLan, both of (TW)

(73) Assignee: Mosel Vitelic Inc., Hsinchu (TW)

( * ) Notice: Subject to any disclaimer, the term of this patent is extended or adjusted under 35 U.S.C. 154(b) by 0 days.

(21) Appl. No.: 09/346,732

(22) Filed: Jul. 2, 1999

(30) Foreign Application Priority Data

Feb. 12, 1999 (TW) ................................................. 88102211

(51) Int. Cl.⁷ ..................................................... G01B 3/14
(52) U.S. Cl. .......................... 33/1 BB; 33/48; 33/501.05; 33/547; 33/549; 33/555.1
(58) Field of Search ................... 33/1 BB, 488, 33/501.05, 613, 644, 645, 545, 546, 547, 549, 550, 551, 555, 562, 712

(56) References Cited

U.S. PATENT DOCUMENTS

| | | | |
|---|---|---|---|
| 1,482,392 | * | 2/1924 | Frank ................................ 33/501.05 |
| 1,790,572 | * | 1/1931 | Bugbee, Jr. ........................ 33/1 BB |
| 2,630,631 | * | 3/1953 | McMullen ............................. 33/549 |
| 4,233,741 | * | 11/1980 | Bisset ................................... 33/488 |
| 4,559,712 | * | 12/1985 | Kubetin ............................. 33/1 BB |
| 4,676,005 | * | 6/1987 | Seligman ............................ 33/613 |
| 4,821,425 | * | 4/1989 | Currie et al. ........................ 33/551 |
| 4,958,442 | * | 9/1990 | Eckhardt ............................ 33/550 |
| 5,060,389 | * | 10/1991 | Frederick ........................ 33/1 BB |
| 5,065,518 | * | 11/1991 | Herrera ............................ 33/1 BB |
| 5,913,585 | * | 6/1999 | Pelland ........................... 33/1 BB |
| 6,108,922 | * | 8/2000 | Lee .................................... 33/613 |

FOREIGN PATENT DOCUMENTS

0276900 * 5/1988 (EP) ........................................ 33/645

* cited by examiner

Primary Examiner—Diego Gutierrez
Assistant Examiner—Madeline Gonzalez
(74) Attorney, Agent, or Firm—Bacon & Thomas

(57) ABSTRACT

A margin inspector for IC wafers includes an upper plate and a supporting portion. The upper plate, which is formed as a transparent plate, has a plurality of concentric circular segments thereon for establishing a set of reference lines to examine the periphery ring of the wafer located under the upper plate while in examining operation. The supporting portion connected with the upper plate is used to form a working space, between the supporting portion and the upper plate, for accommodating the wafer to be examined. By applying these inspecting lines, any deviation on the washout periphery ring of the wafer can be easily and correctly located by eyesight.

12 Claims, 2 Drawing Sheets

MARGIN INSPECTOR FOR IC WAFERS

BACKGROUND OF THE INVENTION

(1) Field of the Invention

The invention relates to a margin inspector for IC wafers, and more particularly to an inspecting apparatus helpfull to visibly examine the washout margin of an IC wafer after a coating process.

(2) Description of the Prior Art

Conventionally, in the process of coating a PR layer or the like membrane onto a wafer, the manufacturing device usually washes out a periphery ring of PR or the like material by a substantial width along the circular edge of the wafer for forming a concise available area thereinside on the wafer. Generally, the allowable width of such periphery ring is ranged between 1.0 mm and 2.0 mm. As long as the width of the periphery ring falls into the allowable range, the wafer is deemed as qualified to proceed the next manufacturing process. Yet, once the width of the periphery ring on a wafer falls beyond the allowable range, the wafer is deemed as an ill-conditional one and needs further amendment.

One of the tools in the art to examine the specifications of the washout periphery ring on a wafer is the microscope. However, the investigation on the periphery ring by a microscope usually implies time-consuming work. To save time and labor in examining the ring, survey by eyesight is usually applied in the field. Yet, one of the disadvantages in eyesight survey is the problem in accurately locating an ill-conditional wafer. Disputation on the qualification usually arises while a wafer is on the verge of allowance; i.e. the width of the periphery ring is around 2.0 mm or 1.0 mm. In the case that a qualified wafer is accidentally determined to be ill-conditional, additional cost and labor on unnecessary wafer amendment can be inevitable. In the case that an unqualified wafer passes the examination, further loss in the sequent manufacturing processes can be foreseen. Obviously, in examining the periphery ring of the wafer after a coating process, neither above case is welcome.

SUMMARY OF THE INVENTION

Accordingly, it is an object of the present invention to provide a margin inspector for IC wafers, which applies several inspecting lines to correctly locate by eyesight a wafer having a qualified washout periphery ring, for facilitating the wafer qualification control after a coating process.

According to one embodiment of the present invention, a margin inspector for IC wafers comprises an upper plate and a supporting portion.

The upper plate, which is formed as a transparent plate, has a plurality of concentric circular segments thereon for establishing a set of reference lines to examine the periphery ring of the wafer located under the upper plate while in examining operation.

The supporting portion, which is connected with the upper plate for supporting purpose, is used to form a working space between the supporting portion and the upper plate, for accommodating the wafer to be examined.

In one embodiment of the present invention, the set of reference lines includes an upper bound line and a lower bound line, for indicating an upper bound and a lower bound on an inner diameter of the periphery ring, respectively. Preferably, the set of reference lines further includes a median line for locating a standard value on the inner diameter of the periphery ring.

Preferably, the set of reference lines is formed as a set of concentric circles.

In one embodiment of the present invention, the margin inspector for IC wafers includes at least 3 spacers, which are extruding from a bottom face of the upper plate. While the wafer in examining operation, the spacers contact substantially at edge of the wafer thereunder for avoiding direct contact of the upper plate and the wafer. Preferably, among the spacers, there exist at least three spacers capable of forming an acute triangle.

In one embodiment of the present invention, the supporting portion comprises a supporting frame and a base. The aforesaid working space is provided between the base and the upper plate, and the supporting frame is used to fix the base to the upper plate.

In one embodiment of the supporting frame, the supporting frame is connected perpendicular to the upper plate; such that, while in examining operation, the wafer in the working space can be convenient at a position having the wafer's edge contacting with an inner surface of the supporting frame. Preferably, the inner surface of the supporting frame is shaped to have a curvature that is the same as a curvature of the edge of the wafer.

BRIEF DESCRIPTION OF THE DRAWINGS

The present invention will now be specified with reference to its preferred embodiments illustrated in the drawings, in which.

DESCRIPTION OF THE PREFERRED EMBODIMENT

The invention disclosed herein is directed to a margin inspector for IC wafers. In the following description, numerous details are set forth in order to provide a thorough understanding of the present invention. It will be appreciated by one skilled in the art that variations of these specific details are possible while still achieving the results of the present invention. In other instances, well-known components are not described in detail in order not to unnecessarily obscure the present invention.

Figure 1:
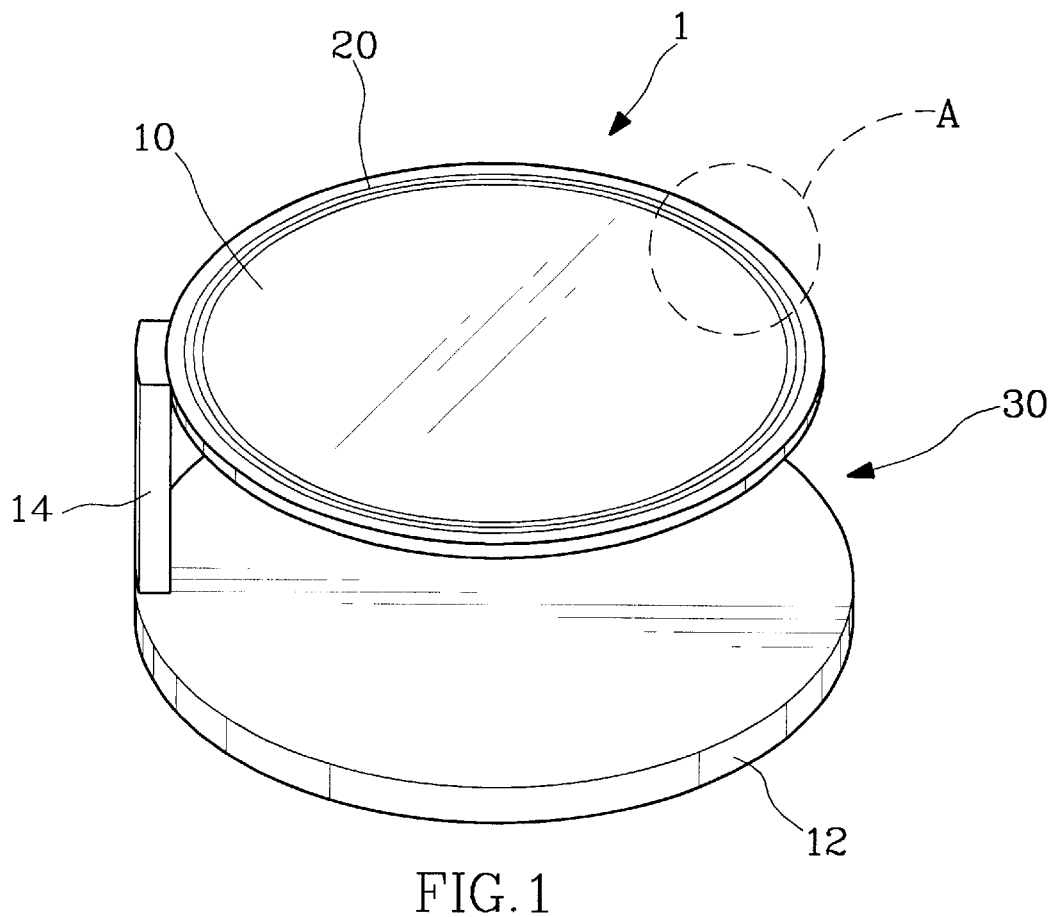
FIG. 1 is a perspective view of one embodiment of the margin inspector for IC wafers in accordance with the present invention.

Referring now to FIG. 1, the margin inspector for IC wafers 1 comprises an upper plate 10 and a supporting portion.

The upper plate 12, which is formed as a transparent plate, has a plurality of concentric circular segments ,thereon for establishing a set of reference lines 20 to examine the periphery ring of the wafer located under the upper plate 10 while in examining operation.

The supporting portion is connected with the upper plate 10 for supporting purpose and can be formed in FIG. 1 as a combination of a base 12 and a supporting frame 14. The supporting portion is used to form a working space 30 between the base 12 and the upper plate 10, in which the working space 30 is used to accommodate the wafer for examination.

According to the present invention, the set of reference lines 20 provides a plurality of predetermined line segments to locate if the washout periphery ring of wafer is within an allowable regime, by substantially overlapping the wafer under the upper plate 10. Preferably, as shown in FIG. 1, the set of reference lines 20 is formed as a set of concentric circles.

Figure 2:
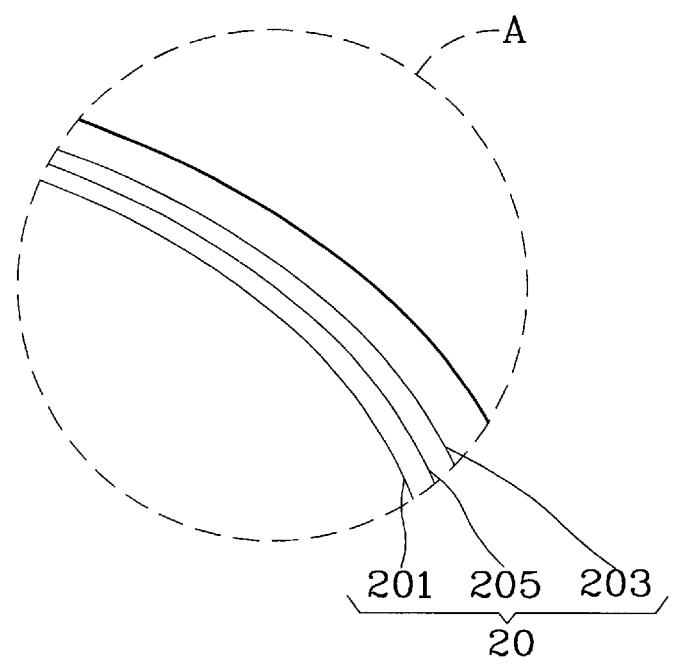
FIG. 2 is an enlarged view of area A of FIG. 1.

Refer now to FIG. 2, in which an enlarged view on portion of the set of reference lines 20 is shown. As shown, the set of reference lines 20 includes an upper bound line 203 and a lower bound line 201, for indicating an upper bound and a lower bound on an inner diameter of the periphery ring, respectively. Preferably, the set of reference lines 20 further includes a median line 205 for locating a standard value on the inner diameter of the periphery ring. Obviously, the median line 205 should locate between the upper bound line 203 and the lower bound line 201. By providing the set of reference lines 20, the qualification of the periphery ring of wafer can be easily located. For example, as the specification of the periphery ring mentioned in the background section, the lower bound line 201, the median line 205 and the upper bound line 203 according to the present invention can be used to indicate the boundary lines of the periphery ring with the width of 2.0 mm, 1.5 mm and 1.0 mm, respectively.

In practice of the set of reference lines 20, complete circles are not necessary. The usage of those reference lines aims at visibly determining if the periphery ring is qualified, so that any set of line segments sufficient to confirm the examination can be an embodiment of the set of the reference lines 20. Also, the outline of the upper plate 10 is not crucial as well. As long as the surface of upper plate 10 can cover the interior area inside the periphery ring, then such an upper plate 20 is said to be all right with the present invention.

Figure 3:
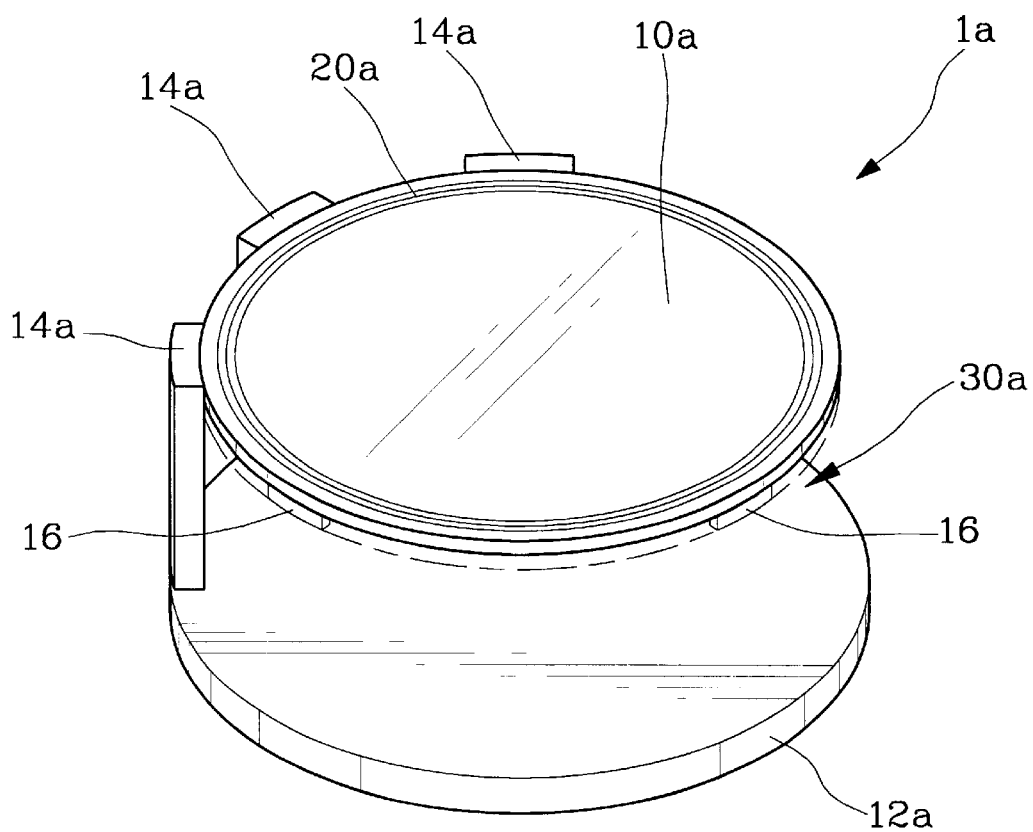
FIG. 3 is a perspective view of another embodiment of the margin inspector for IC wafers in accordance with the present invention.

Referring now to FIG. 3, another embodiment of the present invention is shown. In FIG. 3, the part similar to the part of FIG. 1 in function and name will be labeled by the same part number but with a suffix "a".

As shown in FIG. 3, the margin inspector 1a comprises an upper plate 10a, a plurality of supporting frames 14a and a base 12a. Upon the transparent upper plate 10a, a set of reference lines 20a is formed for providing several circular line segments for inspecting the periphery ring of wafer. The supporting frames 14a are used to connect the base 12a to the upper plate 10a. The space formed between the base 12a and the upper plate 10a is so called a working space 30a of the present invention.

As shown in FIG. 3, the upper plate 10a further includes at least 3 spacers 16 extruding downward from a bottom face of the upper plate 10a. While the wafer in examining operation, the spacers 16 contact substantially at the edge of wafer thereunder for avoiding direct contact of the upper plate 10a and the wafer. Preferably, lower end surfaces of these spacers 16 are coplanar and form a plane parallel to the surface of the upper plate 10a.

In the aforesaid embodiments 1 and 1a, shown respectively in FIG. 1 and FIG. 3, the inner face of supporting frame 14 or 14a can also be used as a locating stop for examining the wafer. For facilitating the locating purpose, the supporting frame 14 or 14a is connected perpendicular to the upper plate 10 or 10a. Under such an arrangement, while in examining operation, the wafer in the working space 30 or 30a can be conveniently located by having the wafer's edge contacting with inner surface of the supporting frame 10 or inner surfaces of supporting frames 10a. Preferably, the inner surface of supporting frames 10 or 10a is substantially shaped to have a curvature that is the same as a curvature of the edge of the wafer. Further, the arrangement of the supporting frame 10 or 10a cannot block the path of the wafer into or retrieved from the working space 30 or 30a.

Figure 4:
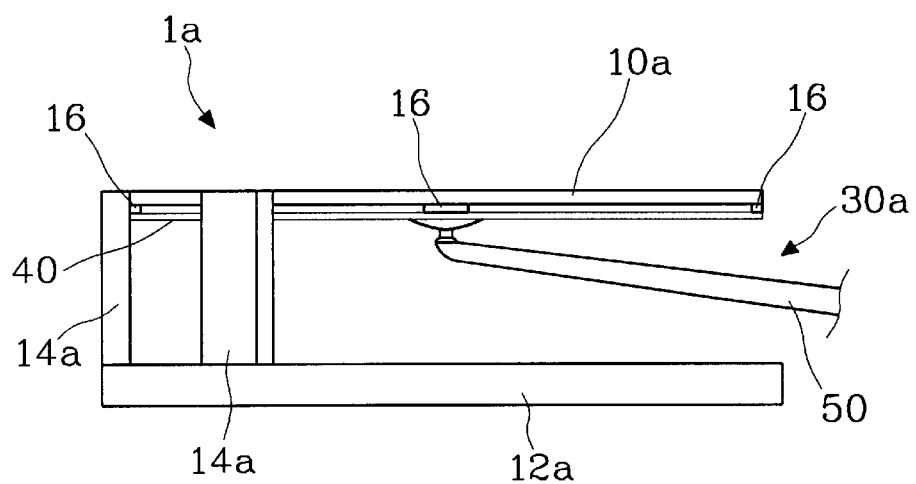
FIG. 4 is a side view of the margin inspector of FIG. 3 in an examining operation.

Referring now to FIG. 4, a side view of the margin inspector 1a of FIG. 3 in an examining operation is shown. Firstly, a wafer 40 is moved into the working space 30a by a tool 50, for example a suck pen as shown. For positioning, the edge of wafer 40 contacts with the inner surfaces of supporting frame 14a, and the lower ends of the spacers 16 contact with the top surface of wafer 40 (i.e. the surface where the washout periphery ring locates). After appropriate adjustment, the qualification-control personnel can easily determine, from top side of the upper plate 10a and by means of comparing visibly the set of reference lines 20a with the periphery ring, if the periphery ring on the wafer 40 is qualified.

While the present invention has been particularly shown and described with reference to preferred embodiments, it will be understood by those skilled in the art that various changes in form and detail may be without departing from the spirit and scope of the present invention.

We claim:

1. A margin inspector for IC wafers, comprising:
    an upper plate, formed as a transparent plate, having a plurality of concentric circular segments thereon for establishing a set of reference lines to examine a periphery ring of the wafer located under the upper plate while in examining operation; and
    a supporting portion, connected with the upper plate for supporting purpose, and forming a working space for examining the wafer therebetween with the upper plate and
    wherein said upper plate includes at least 3 spacers extruding from a bottom face of said upper plate; while in examining operation, said spacers contacting an edge of the wafer thereunder for avoiding direct contact of the upper plate and the wafer.

2. The margin inspector for IC wafers according to claim 1, wherein said set of reference lines further includes an upper bound line and a lower bound line, for indicating an upper bound and a lower bound on an inner diameter of the periphery ring, respectively.

3. The margin inspector for IC wafers according to claim 1, wherein said set of reference lines further includes an upper bound line, a median line and a lower bound line; for indicating an upper bound, a standard value and a lower bound on an inner diameter of the periphery ring, respectively.

4. The margin inspector for IC wafers according to claim 1, wherein said supporting portion further includes a supporting framed a base, the base forming said working space therebetween with said upper plate, and the supporting frame fixing the base to said upper plate.

5. The margin inspector for IC wafers according to claim 6 wherein said supporting frame is connected perpendicular to said upper plate; while in examining operation, the wafer at a position having its edge thereof contacting with an inner surface of the supporting frame.

6. The margin inspector for IC wafers according to claim 5, wherein said inner surface of said supporting frame is substantially shaped to have a curvature the same as a curvature of said edge of the wafer.

7. A margin inspector for IC wafers, comprising:
- an upper plate, formed as a transparent plate, having a plurality of concentric circular segments thereon for establishing a set of reference lines to examine a periphery ring of the wafer located under the upper plate while in examining operation;
- a base, separated from the upper plate and forming a working space therebetween with the upper plate for accommodating the wafer; and
- at least a supporting frame for fixedly connecting the base to the upper plate.

8. A The margin inspector for IC wafers according to claim 7, wherein said set of reference lines further includes an upper bound line and a lower bound line, for indicating an upper bound and a lower bound on an inner diameter of the periphery ring, respectively.

9. The margin inspector for IC wafers according to claim 7, wherein said set of reference lines further includes an upper bound line, a median line and a lower bound line; for indicating an upper bound a standard value and a lower bound on an inner diameter of the periphery ring, respectively.

10. The margin inspector for IC wafers according to claim 7, further includes at least 3 spacers extruding from a bottom face of said upper plate; said spacers located equal-spaced around said upper plate; while in examining operation, said spacers contacting at edge of the wafer thereunder for avoiding direct contact of the upper plate and the wafer.

11. The margin inspector for IC wafers according to claim 7, wherein said supporting frame is connected perpendicular to said upper plate; while in examining operation, the wafer at a position having its edge thereof contacting with an inner surface of the supporting frame.

12. The margin inspector for IC wafers according to claim 7, wherein said inner surface of said supporting frame is substantially shaped to have a curvature the same as a curvature of said edge of the wafer.

* * * * *